United States Patent [19]

Admed et al.

[11] Patent Number: 4,970,087

[45] Date of Patent: * Nov. 13, 1990

[54] SQUEEZABLE BUTTER-LIKE COMPOSITION

[75] Inventors: Salah H. Admed, Elk Grove Village; Anthony J. Luksas, Downers Grove, both of Ill.

[73] Assignee: Dairy Research, Inc., Rosemont, Ill.

[*] Notice: The portion of the term of this patent subsequent to Sep. 6, 2005 has been disclaimed.

[21] Appl. No.: 400,397

[22] Filed: Aug. 30, 1989

[51] Int. Cl.$^5$ .......................... A23D 7/00; A23C 15/16
[52] U.S. Cl. .................................... 426/581; 426/583; 426/607; 426/602
[58] Field of Search ............... 426/581, 582, 583, 585, 426/607, 564, 589, 602

[56] References Cited

U.S. PATENT DOCUMENTS 4,557,103 12/1985 Schwartz et al. .................... 426/581
4,769,255 9/1988 Ahmed et al. ....................... 426/603

Primary Examiner—Donald E. Czaka
Assistant Examiner—Helen Pratt
Attorney, Agent, or Firm—Griffin Branigan & Butler

[57] ABSTRACT

A squeezable butter-like composition is prepared by homogenizing a mixture of a water-in-oil emulsion and an oil-in-water emulsion of liquid dairy products where the ratio of the emulsions is 6:4 to 8.5:1.

7 Claims, No Drawings

SQUEEZABLE BUTTER-LIKE COMPOSITION

This application relates to the subject matter of applicants' prior U.S. Pat. No. 4,769,255, issued on Sept. 6, 1988, and entitled Spreadable Butter-Like Composition and Method of Production Thereof.

BACKGROUND OF THE INVENTION

In the above-noted prior patent, the entire disclosure of which is incorporated herein by reference and relied upon, a composition is disclosed which has a taste, texture and mouth feel similar to butter but which is spreadable at refrigeration temperatures, e.g. 34° to 45° F., and will not oil-out at room temperatures and above, e.g. 85° F. or even 95° F. The composition comprises a concentrated mixture of at least one water-in-oil emulsion and at least one oil-in-water emulsion of dairy products, where the ratio of water-in-oil emulsion to oil-in-water emulsion is at least 6:4 but is less than about 9:1 and wherein the fat content of the butter-like composition is at least about 40%.

The composition is made by preparing a feed of at least one liquid dairy product which is primarily an oil-in-water emulsion and has a fat content of at least about 8%. The feed is concentrated by removing, primarily, water, lactose and ash until a concentrate having at least about 40% fat is obtained. That concentrate is homogenized and the concentrate is caused to have a phase reversal, either prior to, during or after homogenization, so that the emulsion of the concentrate is converted from a primarily oil-in-water emulsion to a predominantly water-in-oil emulsion, whereby the concentrate forms the butter-like composition, and wherein the ratio of water-in-oil emulsion to oil-in-water emulsion in the composition is at least about 6:4 but is less than about 9:1.

The invention of the above-noted prior patent is based on three primary discoveries and several subsidiary discoveries. A first basic discovery in this regard is that all of taste, texture and mouth feel must result from a composition which is predominantly a water-in-oil emulsion.

A second basic discovery of that invention is that the taste, texture and mouth feel of butter results, in part, from butter actually being a combination of a water-in-oil emulsion and an oil-in-water emulsion. While the ability to accurately pinpoint the ratios of the water-in-oil emulsion to oil-in-water emulsion in butter has not been developed, it appears that the ratio in butter is somewhere about 9:1 or above. Unfortunately, however, when that ratio of water-in-oil emulsion to oil-in-water emulsion is about 9:1, or above, the fat phase will crystalize at refrigeration temperature, and thus will render the composition essentially non-spreadable.

Therefore, as a subsidiary discovery in that invention, it was found that compositions which contain both a water-in-oil emulsion and an oil-in-water emulsion, must have a ratio thereof at or below about 9:1, or otherwise the non-spreadability of butter will also appear in that composition.

On the other hand, as a further subsidiary discovery of that invention, it was found that if that ratio is not at least about 6:4, and preferably about at least 7:3, then the taste, texture and mouth feel does not approximate that of butter. For example, it was found that the composition of U.S. Pat. No. 4,511,591, is actually a mixture of water-in-oil emulsion and oil-in-water emulsion, although the oil-in-water emulsion considerably predominates in that composition. Indeed, it appears that the ratio of water-in-oil emulsion to oil-in-water emulsion in the product of that composition is about 1:5 which, as it turns out, is about the same ratio as cream cheese, thus explaining why that composition has a taste, texture and mouth feel more similar to cream cheese than to butter.

As a further basic discovery, it was found that in order to achieve the taste, texture and mouth feel of butter, the composition must have a fat content of at least about 40% (the remainder being primarily water, milk serum and protein). Otherwise, the composition will have a predominantly watery taste, texture and mouth feel, as opposed to a predominantly fat taste, texture and mouth feel of butter.

As another subsidiary discovery in this regard, it was also found that the composition must be prepared so that essentially all of the fat which ultimately resides in the composition is in the emulsions from which the composition is formed and that fat cannot be added after those emulsions are formed, which is opposite the process in above-mentioned U.S. Pat. No. 4,511,591.

Finally, as a subsidiary discovery in that invention, it was found that in order to achieve these high fat levels, the dairy product from which the composition is made must be considerably concentrated prior to forming the composition; otherwise its high fat levels cannot be obtained, and the resulting composition will not have the taste, texture and mouth feel of butter.

In the process described in the above-noted prior patent, one or more feeds are used to produce a mixture which has a fat content of at least about 8%. The feeds can be any dairy products, so long as those dairy products are in liquid form and so long as those dairy products are primarily oil-in-water emulsions. However, most dairy products, indeed, meet these requirements and, therefore, any of the conventional dairy products may be used, for example, skim milk, low-fat milk, whole milk, non-fat milk solids, and cream and concentrated forms thereof, e.g. evaporated skim milk, whole milk, and cream. Other dairy products, such as buttermilk, could be used, and the particular form of the dairy product is not critical, other than the two reservations noted above. If, for example, skim milk is used as a feed, then a second feed must be used, since skim milk will not provide the necessary fat content of at least about 8%. Accordingly, in this situation, there would be at least two feeds, e.g. one of skim milk and one of cream so that the fat content of the mixture reaches at least about 8%. On the other hand, the amount of fat in the mixture cannot be overly high, since it will interfere with the concentration step. Thus, preferably, the fat content is not above about 30%, although higher fat contents than this may be used, e.g. up to about 35% fat or even a bit higher, if care is taken in the concentration step. Nevertheless, for practical and usual purposes, the fat content of the mixture will not be greater than about 30%.

After the mixture is formed, that mixture must be concentrated so that the concentrate has a fat content of at least about 40%, but more preferably about 50%. The concentrate may have a fat content up to about 60%, or even greater, but at fat contents significantly above 60%, the concentration step becomes more difficult.

The preferred concentration step utilizes ultrafiltration. Any conventional ultrafiltration unit may be used in this regard, and it is only necessary that the ultrafiltration unit retain substantially all of the protein in the concentrate (the protein, in part, functions as the natural emulsifiers), with the permeate containing, primarily, water, lactose and ash. This is achieved by the usual dairy ultrafiltration unit, and, thus, any conventional dairy ultrafiltration unit may be used in the concentrating step. Likewise, conventional temperatures for operating the ultrafiltration unit are quite acceptable, e.g. 100° to 130° F., although temperatures outside of this range may be used, if desired, e.g. 40° to 150° F.

After the concentration step, the resulting concentrate is homogenized. Any of the conventional dairy homogenizers may be used in this regard, and those homogenizers may be operated at conventional temperatures, e.g. 120° to 160° F., although temperatures outside of this range may be used if desired, e.g. 110° to 180° F. However, either prior to, during or after homogenization, the concentrate must experience a phase reversal, i.e. reversing the emulsion from, primarily, an oil-in-water emulsion to, predominantly, a water-in-oil emulsion. This phase reversal can be achieved by any relatively high shear mixing operation. However, since homogenization is a high shear mixing operation, it is more convenient and efficient to achieve at least a portion of the phase reversal during the homogenization step and in the homogenizer. Thus, it is only necessary to operate the conventional dairy homogenizer for a time and at a shear rate which will not only homogenize the product but achieve a portion of the phase reversal at the same time. With the phase reversal, the concentrate forms a butter-like composition which is, essentially, the product of the invention of the prior patent.

With butterfat concentrations of about at least 40%, the phase reversal is relatively easy to achieve in the usual dairy processing apparatus. As the feed is being further and further concentrated during ultrafiltration (the preferred concentration device), and the butterfat content is increased, some phase reversal will commence during ultrafiltration. When the butterfat content, during continued ultrafiltration, significantly exceeds 40%, substantial amounts of phase reversal will take place during ultrafiltration. Thus, it is possible to achieve the phase reversal, especially in regard to the lower emulsion ratios, entirely during ultrafiltration.

However, additional shear is often required to achieve the desired degree of phase reversal, especially in regard to the higher emulsion ratios, and this additional shear is provided by the homogenization step, where further phase reversal takes place. In addition, even if all of the desired phase reversal takes place during ultrafiltration, the composition should nevertheless be homogenized, or otherwise the product will not be of the quality and uniformity normally desired.

Accordingly, while the ultrafiltration step is referred to as a concentration step, in fact, significant or even substantially all of the required phase reversal may take place in that step. Likewise, while the homogenization step is characterized and a means of achieving phase reversal, little or most or even all of the phase reversal may take place during homogenization. Thus, it is the combination of ultrafiltration and homogenization which achieves the required phase reversal and the completion of the product.

To complete the composition, only conventional ingredients need be added. These conventional ingredients can include flavorings, such as salt, colorings, e.g. FDA yellows, and the like.

The composition is then packaged in any convenient package by any conventional packaging apparatus. While pasteurization may be performed during packaging, if a pasteurizing step is desired, it is preferred that the pasteurizing step take place prior to homogenization. Thus, the pasteurizing step, if desired, may take place at any point in the process, preferably prior to homogenization, and more preferably in the feed step, although pasteurization anytime prior to packaging may be used.

The composition can be molded, for example, into one pound blocks, quarter pound sticks, or packaged in tubs in the conventional manner.

The characteristics of the composition will somewhat depend on the ratio of the water-in-oil emulsion to the oil-in-water emulsion. With lower ratios, the spreadability will increase but the taste, texture and mouth feel will not be as close to that of butter as would be higher ratios. On the other hand, as the ratio is increased, the taste, texture and mouth feel will be more similar to butter, but the spreadability thereof will decrease. The optimum combination of these properties is where the ratio is about 7:3 to 8:2, and this will produce a taste, texture and mouth feel very similar to butter, while providing good spreadability.

As can be seen from the above discussion of the composition of the prior patent, that composition produces a considerably improved spread. However, that composition remains in a semi-solid condition even at elevated temperatures, as disclosed in that prior patent. For some uses, that property of the composition of the prior patent is a disadvantage. For example, there are some compositions of butter-like spreads where some fluidity is desired. For example, when a butter-like spread is placed on hot boiled corn-on-the-cob, it is the normal expectation of the consumer that some fluidity will result, so that the spread will evenly distribute itself on the hot corn-on-the-cob. The composition of the prior patent does not exhibit those spreading properties in view of its non-oiling-out properties, even at elevated temperatures. Thus, for certain uses, it would be preferred that the composition of the prior patent be rendered fluid so that it may distribute itself, for example, when placed on hot boiled corn-on-the-cob.

BRIEF DESCRIPTION OF THE INVENTION

It has now been discovered that the composition of the prior patent can be rendered into a semi-fluid condition such that it is capable of distributing itself by viscous flow, particularly on hot foods and the like. In this regard, as disclosed in the prior patent, the viscosity of the composition of the prior patent can be changed by a selection of various parameters in carrying out the process of the prior patent. As disclosed therein, among others, the ratio of water-in-oil emulsion to oil-in-water emulsion, the total fat content of composition, the total solids level of the composition, the temperature to which the feeds of the process are heated, and the degree of homogenization of the composition all have bearing on the viscosity of the resulting composition. It has now been found that by a selection of those parameters, the composition of the prior patent can be rendered into a semi-fluid state, such that the composition can be made to distribute itself on foods.

To achieve that semi-fluid state of the composition, one or more of the afore-noted variables may be adjusted to achieve that fluidity, but in addition thereto, it has been found that the ratio of water-in-oil emulsion to oil-in-water emulsion should be lower than the range of ratios disclosed in the prior patent. Thus, that range should be at least about 6:4, in order to impart the desired butter flavor to the semi-fluid composition, but that ratio should also be less than about 8.5:1, in order to achieve a semi-fluid condition of the composition. Within that range of ratio of the water-in-oil emulsion to oil-in-water emulsion, selection of the processing parameters, as briefly noted above, can be used to achieve the desired fluidity. By a proper selection of those parameters, the fluidity of the composition can be adjusted such that the composition is dispensable from a manually-operated squeeze container, such as those containers conventionally used for dispensing the so-called "squeezable" spreads.

Thus, briefly stated, the present invention provides a squeezable butter-like composition which has a taste and mouth feel similar to softened butter, but which will not oil-out at room temperature. The composition comprises a homogenized concentrated mixture of at least one water-in-oil emulsion and at least one oil-in-water emulsion of liquid dairy products, but wherein the ratio of the water-in-oil emulsion to the oil-in-water emulsion is at least about 6:4 but is less than 8.5:1, and wherein the fat content is at least about 40% and the composition is dispensable from a manually-operated squeezable container.

DETAILED DESCRIPTION OF THE INVENTION

The so-called squeezable spreads, commercially available on the market, are formulated from various ingredients, e.g. fats and oils, to have a semi-fluid viscosity at refrigeration temperatures so that the viscosity is sufficiently low that the spreads may be dispensed from a conventional squeeze bottle, e.g. a flexible plastic bottle with a dispensing spout. Bottles of this nature have been used for dispensing other foods, such as catsup, mustard and the like, and spread compositions dispensed in a similar manner have become quite popular. These spread compositions, however, being based essentially on emulsified vegetable fats, with considerable water contents, have very little taste at all similar to butter, and even very little taste similar to margarine. With the present invention, a spread having the same convenience as the conventional squeezable spreads is provided, but the present composition has a very significant butter-like flavor. In addition, the squeezable compositions commercially available are rendered in such a low viscosity for squeezable purposes that when those commercially available squeezable compositions are placed on hot foods, such as hot boiled corn-on-the-cob, the fluidity thereof increases so greatly, that it is difficult to retain those commercially squeezable spreads on the hot food. With the present composition, although it is dispensable by the same squeezable action, the viscosity thereof does not substantially change when placed on the hot foods, and therefore, the present composition is able to distribute itself on the hot food and remain on the hot food.

Squeezable compositions must be dispensable from a manually-operated squeezable container, e.g. a conventional flexible plastic container with an appropriate spout. The dispensing thereof must also be adequate without undue manual force being applied to the container. In other words, the dispensing must be satisfactory with only a reasonable grasping of the container by the hand and with reasonable force by that hand in dispensing the spreadable composition from the container. This dispensing must also be satisfactory that with a single squeeze, or no more than four or five squeezes, a customary amount of the squeezable composition is dispensed from the container. Thus, for example, for most squeezable compositions, including the conventional spread composition, the spout of the container is designed to dispense the composition in a cylindrical or ribbon form of from about one-eighth inch to about one-quarter inch in diameter or width. That cylindrical form or width should be conveniently dispensed by a reasonable grasping and squeezing of the flexible plastic bottle by the ordinary consumer, and such a squeeze should dispense an amount of the composition reasonably calculated to be satisfactory for a single application of the composition. For example, mustard compositions dispensed from a squeezable bottle are capable of dispensing a ribbon of mustard almost along the length of a conventional-sized hotdog with one or possibly two, but no more than three, squeezes of the container.

The same sort of requirements are required with the present invention. Thus, the present squeezable composition must be dispensable from an ordinary flexible plastic container with a spout reasonably sized for dispensing a cylindrical form or ribbon of the composition with a diameter or width of from about one-eighth inch up to about one-half inch, with such dispensing being by one, two, three or four reasonable squeezes for an ordinary application of the spread. This is intended to be the meaning of dispensable from a manually-operated squeezable container.

To achieve the foregoing, as noted above, the ratio of water-in-oil emulsion to oil-in-water emulsion must be no greater than about 8.5:1, but more preferably that ratio is less than about 8:1. Even more preferably, that ratio is between about 6:4 and 7.3:1. Within these ranges of emulsions, the other parameters of the process, described above, can be adjusted to give the required squeezable composition.

The adjustment of those parameters will vary with the precise ratios of the emulsions, as well as the precise fat content of the squeezable composition, i.e. fat contents above 40%. However, by conducting a limited number of tests within those operating parameters, it is easy to arrange those parameters such that a squeezable composition results. Only a limited number of tests need be run in that regard. In conducting those tests, however, in order to assess the effect of the change in those parameters, it is convenient to measure the conepenetration number, which is a convenient method of determining the viscosity of the composition. As disclosed in the prior patent, this test is conveniently carried out with a Universal-Sergeant-Welsh Penitrometer, Catalog No. S-2235, for plasticized fats. A convenient penetration cone is S-63865, and the test should be carried out according to ASTM D-217. With this test, the variables, noted above, are changed until the conepenetration number of the composition at 36° F. is at least 275, but more preferably is at least 295. On the other hand, the fluidity of the composition can become too fluid, and for that reason, it is preferable that the cone-penetration number is less than about 400, and a preferred range of the cone-penetration number is from about 310 to 400. This will provide a fluidity which renders the composition easy to manually dispense from a conventional squeeze bottle, will allow the composition to distribute itself, particularly on hot foods, but will not allow the composition to become so low in viscosity that it is difficult to contain the composition on the hot foods.

The present composition should be contrasted with the composition of the prior patent, mainly, in terms of the viscosity thereof. The composition of the prior patent is shape sustaining at room temperature under the force of gravity. The present composition at room temperature will flow under the force of gravity. Thus, for example, it is of a viscosity similar to a butter sauce and the like, as opposed to a viscosity similar to butter. Since the present composition will flow at room temperature under the force of gravity, it is amenable to a number of formulations which the composition of the prior patent could not accommodate. For example, the present composition can be flavored with various conventional flavors to produce compositions similar to sauces, toppings, dressings and the like. When flavored with a cheese, e.g. cheddar cheese, Roquefort cheese, etc., a cheese sauce can be produced suitable for meats, poultry and vegetables. Alternatively, the composition can be flavored with cucumber flavor or spices to make a salad dressing. Further, the composition can be flavored with conventional frozen dessert flavors, such as chocolate and vanilla, and frozen into a soft serve composition which is very rich and creamy. By adding conventional lighteners, such as titanium dioxide, the composition is suitable as a coffee creamer. In addition, the composition can be whipped by conventional whipping techniques to make a whipped topping similar to whipped cream or make a composition similar to a milkshake or a whipped frozen soft serve dessert. By controlling the amount of whip, various whipped beverages may be produced.

What is claimed is:

1. A squeezable butter-like composition which has a taste and mouth feel similar to softened butter, but which will not oil-out at room temperatures comprising a homogenized concentrated mixture of at least one water-in-oil emulsion and at least one oil-in-water emulsion of liquid dairy products which are primarily oil-in-water emulsions in their natural states, wherein the ratio of water-in-oil emulsion to oil-in-water emulsion is at least about 6:4 but is less than 8.5:1, wherein the fat content is at least about 40%, and the composition is dispensable from a manually-operated squeezable container.

2. The composition of claim 1 wherein the said ratio is less than 8:1.

3. The composition of claim 1 wherein the ratio is between about 6:4 and 7.3:1.

4. The composition of claim 1 wherein the composition has a cone-penetration number at 36° F. of at least about 275.

5. The composition of claim 4 wherein the cone-penetration number is at least 295.

6. The composition of claim 5 wherein the cone-penetration number is from about 310 to 400.

7. The composition of claim 1 flavored with a food flavor and in the form of a sauce, dressing, dessert, creamer, whipped topping, or whipped beverage.

* * * * *